United States Patent [19]

Karasiewicz et al.

[11] 4,091,525
[45] May 30, 1978

[54] REAMER FOR FINE REAMING OF PORTS

[75] Inventors: Czeslaw Karasiewicz; Janusz Seliborski, both of Warsaw, Poland

[73] Assignee: Kombinat Maszyn Budowlanych "Bumar" Warszawskie Zaklady Maszyn Budowlanych IM.L. Warynskiego, Warsaw, Poland

[21] Appl. No.: 696,818

[22] Filed: June 16, 1976

[30] Foreign Application Priority Data

June 20, 1975 Poland .................................. 181428

[51] Int. Cl.² ............................................. B24B 39/02
[52] U.S. Cl. ....................................... 407/1; 29/90 R; 408/82; 408/229
[58] Field of Search ..................... 408/22, 27, 82, 145, 408/165, 229, 230, 707, 709, 83, ; 29/90, 566, 567; 51/181 NT

[56] References Cited

U.S. PATENT DOCUMENTS

| 897,041 | 8/1908 | Wellee | 408/82 |
| 2,030,846 | 2/1936 | Bishton | 408/165 |
| 2,923,181 | 2/1960 | Grage | 408/229 |

Primary Examiner—Z. R. Bilinsky
Attorney, Agent, or Firm—Haseltine, Lake & Waters

[57] ABSTRACT

A reamer for fine reaming of ports containing a working portion with cutting blades in which, and a rear guiding portion in which at least three smoothing inserts are fitted the smoothing inserts, being inclined at a common auxiliary negative relief angle H' the value of which remains within the limits of 0° 0' to 0° 5'.

6 Claims, 3 Drawing Figures

REAMER FOR FINE REAMING OF PORTS

BACKGROUND OF THE INVENTION

This invention relates to a reamer for fine reaming of ports, especially adapted for manufacturing hydraulic and pneumatic equipment elements.

There are known and employed finishing reamers having a guiding front portion and a working portion provided with blades, wherein the cutting portion and the cylindrical guiding portion are distinguished. Behind the working portion a rear guiding portion is provided, having its diameter smaller than that of the working portion. The disadvantage of said reamers consists therein that ports can be machined therewith with an accuracy exceeding 5 $\mu$m. Such a machining accuracy is insufficient for manufacturing various workpieces, equipments.

SUMMARY OF THE INVENTION

It is accordingly a main object of the invention to provide a construction of a reamer that makes possible to increase the accuracy of machined ports down to 2.5 $\mu$m, and to obtain better surface quality.

The reamer according to the invention has its working portion equipped with cutting blades, and a rear guiding portion having at least three smoothing inserts made of hard and wear-resistant material, whereby the blades of the working portion and the smoothing inserts of the guiding portion are inclined under a common, negative, auxiliary relief angle H'. The smoothing inserts are fitted in grooves made on the periphery of the rear guiding portion along the axis of the reamer, and are designed both for smoothing the surface of the port and to accurate guiding the reamer within the port to be machined. The value of the angle H' remains within the limits of 0°0' to 0°5' and depends on the sort of the machined material.

The advantage of the reamer according to the invention consists in substantially increasing of the accuracy and surface quality of machined ports, in extending the life of the tool, and in elimination of faults caused by not maintaining the dimensional tolerances and form errors of machined ports. The several times increased life of the reamer according to the invention results therefrom that it is accurately guided in the axis of the machined port, both at its working portion and rear guiding portion. This allows for the use of the reamer until the working portion is almost completely worn.

BRIEF DESCRIPTION OF THE DRAWING

The invention will be now described in particulars by way of an exemplary embodiment with reference to the accompanying drawing in which.

DETAILED DESCRIPTION

Figures 1, 2, 3:
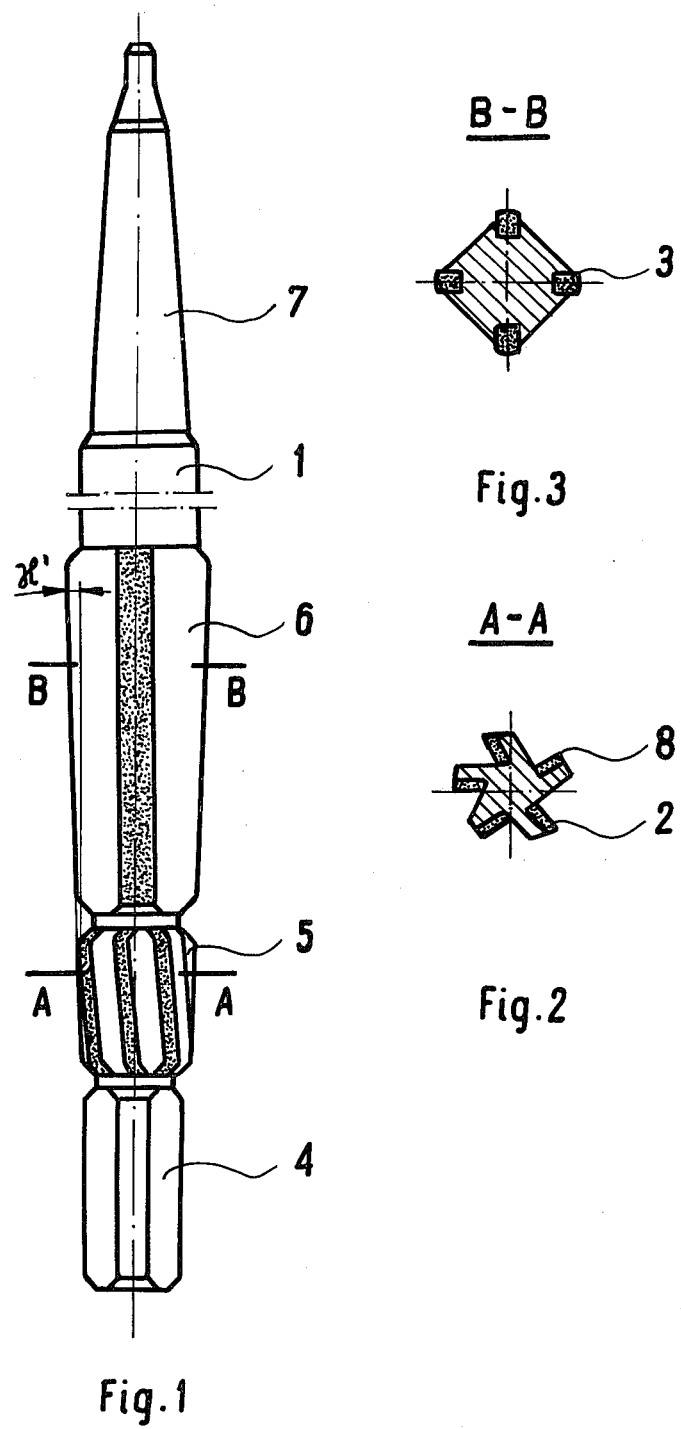
FIG. 1 is the side view of the reamer.
FIG. 2 is a cross-sectional view taken on line A-A in FIG. 1.
FIG. 3 is a cross-sectional view taken on line B-B in FIG. 1.

The reamer consists of the body 1, the front guiding portion 4, the working portion 5, the rear guiding portion 6 and the shank 7. The working portion 5 is equipped with plates 2 with cutting blades 8, and the rear guiding portion has four smoothing inserts 3 made of sintered carbides.

In FIG. 3 a cross section of rear guiding portion 6 is shown. It can be seen that smoothing inserts 3 are longitudinally fitted in the body of the rear guiding portion and the outer edge of the smoothing inserts extends beyond the outer surface of rear guiding portion 6 and is inclined at an angle of 0°0' to 0°5' measured from the rotational axis of the reamer.

The working portion 5 may be as shown in FIGS. 1 and 2. Plates 2 with cutting blades 8 are longitudinally fitted in the working portion at an angle of 0°0' to 0°5' measured from the rotational axis of the reamer. Working portion 5 has a front end at which the front guiding portion 1 is connected thereto and the rear guiding portion 6 is connected to the rear end of the working portion.

The cutting blades of the working portion can be of the usual type as is well known in the art. The outer edge of the cutting blades 2 lie in the same plane as the outer edge of the smoothing inserts 3. More specifically, the outer edges of the blades and the outer edges of the smoothing inserts lie on the lateral surface of a right circular cone whose generatrix is inclined at an angle greater than 0°0' and less than 0°5' with respect to the rotational axis of the reamer. The smoothing inserts 3 can be made of sintered carbides or any other material known in the art to be a hard and wear resistant material.

The operation of reaming by means of the reamer according to the invention is performed as follows: For the semi-finishing machining of the port the reamer is introduced by its front guiding portion 4. Thereafter, as the working portion 5 comes into contact with the port, the cutting operation begins. As the reamer goes deeper into the port, the working portion 5 and the rear guiding portion 6 take part in the machining process. The conical shape of the working portion 5 and the rear guiding portion 6 enables an accurate guiding of the reamer in the axis of the port to be reamed, and smoothing of the surface of the port. The reaming ends as the rear guiding portion 6 passes through the reamed port.

What is claimed is:

1. A reamer rotatable about its axis for fine reaming of a port comprising a working portion, a front guiding portion for guiding said reamer into said port, and a rear guiding portion, said working portion being connected to said front and rear guiding portions intermediate thereof so that said working portion enters said port after said front guiding portion and before said rear guiding portion, said working portion comprising cutting blades, said rear guiding portion comprising at least three smoothing inserts in said rear guiding portion, said smoothing inserts having respective outer edges extending beyond the outer surface of said rear guiding portion, said outer edges of said smoothing inserts and said cutting blades lying on the lateral surface of a right circular cone whose generatrix is inclined towards said front guiding portion at a relief angle greater than 0°0' and less than 0°5' with respect to the rotational axis of said reamer.

2. A reamer rotatable about its axis for fine reaming of a port comprising working means for enlarging said port, a first and a second guiding means for guiding said reamer into said port, said working means being connected to said first and second guiding means intermediate thereof so that said working means enters said port after said first guiding means and before said second guiding means, said working means comprising blades having edges inclined towards said first guiding means at an angle greater than 0°0′ and less than 0°5′ measured from the rotational axis of said reamer, said second guiding means comprising smoothing means for smoothing the edges of the port being reamed, said smoothing means being fitted in said second guiding means and having edges which are disposed in common with the edges of the blades on the lateral surface of a right circular cone whose generatrix is inclined towards said first guiding means at an angle greater than 0°0′ and less than 0°5′ measured from the rotational axis of said reamer.

3. A reamer as claimed in claim 1 wherein said rear guiding portion and said inserts therein have substantially greater length compared to said blades in said working portion.

4. A reamer as claimed in claim 3 wherein said inserts are rectangular and have a flat outer surface.

5. A reamer as claimed in claim 2 wherein said second guiding means and said smoothing means therein have substantially greater axial length compared to said blades in said working means.

6. A reamer as claimed in claim 5 wherein said smoothing means are rectangular inserts fitted in said second means and having flat outer surfaces.

* * * * *